(12) United States Patent
Northcott et al.

(10) Patent No.: US 10,466,395 B1
(45) Date of Patent: Nov. 5, 2019

(54) SYSTEMS WITH MATTE INFRARED-TRANSPARENT LAYERS

(71) Applicant: Apple Inc., Cupertino, CA (US)

(72) Inventors: Malcolm J. Northcott, Santa Cruz, CA (US); Matthew E. Last, San Jose, CA (US); Irene Perali, San Francisco, CA (US); Bradford J. Zercoe, Danville, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 15/703,749

(22) Filed: Sep. 13, 2017

Related U.S. Application Data (60) Provisional application No. 62/397,457, filed on Sep. 21, 2016.

(51) Int. Cl.
*G02B 5/20* (2006.01)
*H04N 5/33* (2006.01)
(Continued)

(52) U.S. Cl.
CPC ............. *G02B 5/208* (2013.01); *G02B 1/04* (2013.01); *G02B 5/26* (2013.01); *H04N 5/332* (2013.01)

(58) Field of Classification Search
CPC .......... G02B 5/281; G02B 5/22; G02B 5/208; G02B 5/26
See application file for complete search history.

(56) References Cited

U.S. PATENT DOCUMENTS

| | | | | |
|---|---|---|---|---|
| 2,742,819 A | * | 4/1956 | Koch | ..................... G02B 5/282 353/20 |
| 4,342,987 A | * | 8/1982 | Rossin | ................... G08B 13/19 250/340 |

(Continued)

FOREIGN PATENT DOCUMENTS

| | | | |
|---|---|---|---|
| CN | 203732745 U | * 7/2014 | |
| JP | 04294496 A | * 10/1992 | |
| WO | WO-2017124664 A1 | * 7/2017 | ............... G02B 5/22 |

OTHER PUBLICATIONS

Machine generated translation of CN 203732745 U to Liang (Year: 7201).*

*Primary Examiner* — David E Harvey
(74) *Attorney, Agent, or Firm* — Treyz Law Group, P.C.; G. Victor Treyz; Michael H. Lyons (57) ABSTRACT

A system such as a vehicle system, building, or electrical equipment may be provided with one or more optical components. The optical components may include a near-infrared camera or other components that operate at near-infrared wavelengths. A visible-light-reflecting-and-infrared-light-transmitting layer may overlap the optical component. This overlapping layer may have first and second index-matched layers and an interposed textured layer. The textured layer may be a thin-film interference filter or other coating that is configured to reflect visible light while transmitting infrared light. The transmitted infrared light may pass to the optical component with minimal wavefront distortion due to the index matching of the first and second layers. The texture of the textured layer may cause visible light to reflect diffusely and thereby provide the visible-light-reflecting-and-infrared-light-transmitting layer with a matte appearance.

20 Claims, 5 Drawing Sheets

(51) Int. Cl.
  *G02B 1/04*     (2006.01)
  *G02B 5/26*     (2006.01)

(56) References Cited

U.S. PATENT DOCUMENTS

| | | | | |
|---|---|---|---|---|
| 5,818,631 A * | 10/1998 | Askinazi | ............... | G02B 1/105 |
| | | | | 359/350 |
| 7,199,767 B2 | 4/2007 | Spero | | |
| 9,570,490 B2 * | 2/2017 | Kakiuchi | ............... | G02B 5/208 |
| 2002/0135571 A1 * | 9/2002 | Klocek | ............... | G02B 23/12 |
| | | | | 345/204 |
| 2003/0016368 A1 | 1/2003 | Aman et al. | | |
| 2003/0054160 A1 | 3/2003 | Fisher et al. | | |
| 2003/0161997 A1 | 8/2003 | Moran | | |
| 2004/0125603 A1 * | 7/2004 | Chundury | ............... | C08K 3/22 |
| | | | | 362/296.04 |
| 2004/0130702 A1 | 7/2004 | Jupp et al. | | |
| 2005/0099678 A1 * | 5/2005 | Wang | ............... | G02B 5/208 |
| | | | | 359/359 |
| 2006/0228559 A1 * | 10/2006 | Denker | ............... | B32B 27/36 |
| | | | | 428/412 |
| 2007/0196630 A1 | 8/2007 | Hayes et al. | | |
| 2008/0316594 A1 * | 12/2008 | Hashiguchi | ............ | G02B 5/281 |
| | | | | 359/359 |
| 2009/0284603 A1 * | 11/2009 | Hsieh | ............... | C08J 3/201 |
| | | | | 348/164 |
| 2011/0140106 A1 * | 6/2011 | Forbes | ............... | H01L 31/0236 |
| | | | | 257/53 |
| 2011/0310487 A1 * | 12/2011 | Nagahama | ............... | E06B 9/24 |
| | | | | 359/599 |
| 2013/0063810 A1 * | 3/2013 | Miyaguchi | ............ | G02B 5/281 |
| | | | | 359/359 |
| 2014/0056028 A1 | 2/2014 | Nichol et al. | | |
| 2014/0198379 A1 * | 7/2014 | Akedo | ............... | G02B 1/105 |
| | | | | 359/350 |
| 2015/0192717 A1 * | 7/2015 | Katagiri | ............... | G02B 5/26 |
| | | | | 359/359 |
| 2015/0205128 A1 | 7/2015 | Border | | |
| 2015/0212384 A1 * | 7/2015 | Kitson | ............... | G02B 27/144 |
| | | | | 359/263 |
| 2017/0123122 A1 * | 5/2017 | Ballif | ............... | G02B 1/11 |
| 2017/0184764 A1 * | 6/2017 | Matsuyuki | ............ | G02B 5/208 |
| 2018/0067245 A1 * | 3/2018 | Giachino | ............ | G02B 5/281 |

\* cited by examiner

SYSTEMS WITH MATTE INFRARED-TRANSPARENT LAYERS

This application claims the benefit of provisional patent application No. 62/397,457, filed on Sep. 21, 2016, which is hereby incorporated by reference herein in its entirety.

FIELD

This relates generally to infrared-transparent structures, and, more particularly, to systems having infrared-transparent layers with a matte appearance.

BACKGROUND

In vehicles, building systems, portable electronic devices, and other systems, it is often desirable to provide structures that modify the propagation of light. For example, it may sometimes be desirable to provide these systems with layers that block visible light while transmitting infrared light.

It can be challenging to incorporate infrared-transparent structures such as these into systems. If care is not taken, structures that are infrared-transparent will have an undesirable appearance.

SUMMARY

A system such as a vehicle system, building, or electrical equipment may be provided with one or more optical components. The optical components may include a near-infrared camera or other components that operate at near-infrared wavelengths.

A visible-light-reflecting-and-infrared-light-transmitting layer may overlap the optical component. This overlapping layer may have first and second index-matched layers and an interposed textured layer. The textured layer may be a thin-film interference filter or other coating that is configured to reflect visible light while transmitting infrared light.

The infrared light that passes through the visible-light-reflecting-and-infrared-light-transmitting layer may reach the optical component with minimal wavefront distortion due to the matched refractive indexes of the first and second layers.

The texture of the textured layer may cause visible light to reflect diffusely and thereby provide the visible-light-reflecting-and-infrared-light-transmitting layer with a matte appearance. Colorant such as dye or pigment may be added to the visible-light-reflecting-and-infrared-light-transmitting layer to match the appearance of the visible-light-reflecting-and-infrared-light-transmitting layer to nearby structures in the system.

DETAILED DESCRIPTION

A system may have infrared optical components. Infrared-transparent layers may cover infrared optical components to protect the infrared optical components and to hide the infrared optical components from view.

Figure 1:
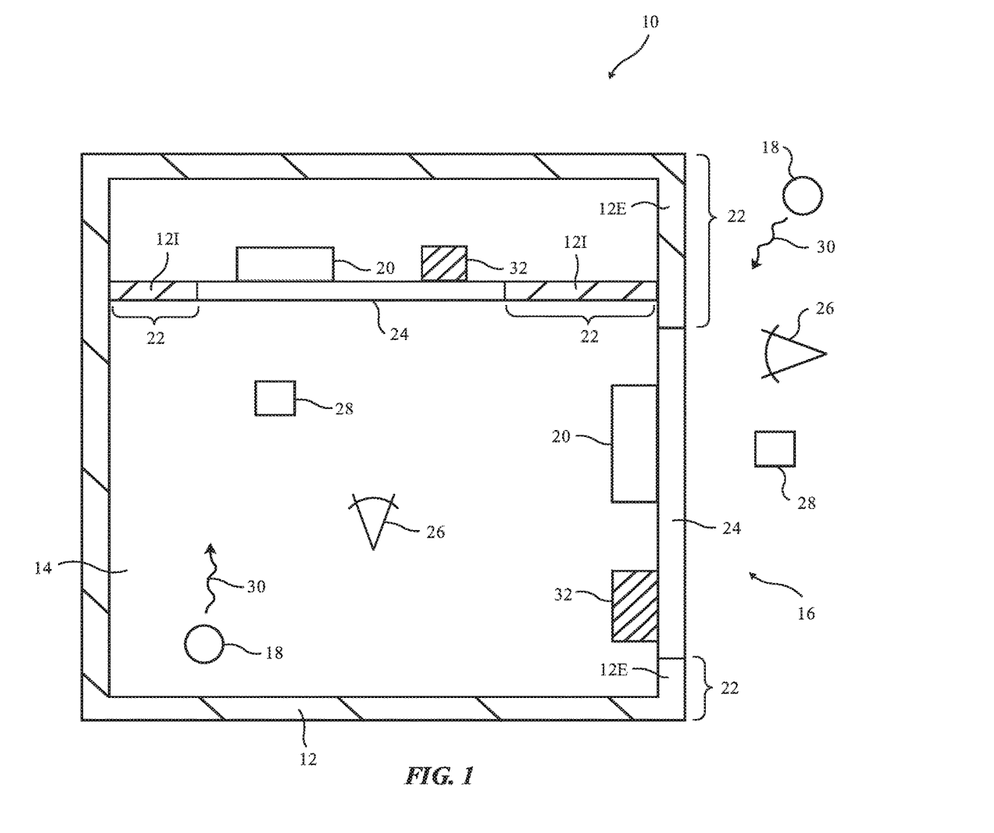
FIG. 1 is a diagram of an illustrative system in accordance with an embodiment.

FIG. 1 is a diagram of an illustrative system that may include an infrared-transparent layer. System 10 of FIG. 1 may be a building, a vehicle, electronic equipment such as a cellular telephone, laptop computer, or other portable electronic device, or other suitable system that includes electrical components. Some of the electrical components may be light-based components (sometimes referred to as optical components) that operate using infrared light. As an example, system 10 may include one or more infrared optical components such as components 20.

Components 20 may be mounted in alignment with structures that are transparent to infrared light such as infrared-light-transparent layers (structures) 24. Layers 24 may be at least partly opaque at visible light wavelengths. For example, when viewed by a user of system 10, layers 24 may be black or may be white or have other non-black colors (e.g., blue, green, red, silver, yellow, gold, or other non-black colors).

System 10 may have support structures such as support structures 12. In a vehicle, support structures 12 may form portions of a vehicle body or portions of a vehicle window (as examples). In other systems, support structures 12 may form walls in a device or building.

Infrared-transparent layers 24 may be mounted in openings in structures 12. Infrared components such as components 20 may be mounted behind infrared transparent layers 24 so that components 20 are overlapped by layers 24 and therefore are protected by layers 24.

Structures 12 may be configured to completely or partly surround an interior region such as interior region 14 and may separate interior region 14 from exterior region 16. Viewers 26 of layers 24 may include viewers 26 that are located in interior region 14 (e.g., viewers 26 may include vehicle occupants when system 10 is a vehicle) and may include viewers that are located in exterior region 16 (e.g., viewers 26 may include external observers).

Layer 24 and surrounding portions of system 10 may be illuminated by interior and exterior light sources 18. Light sources 18 may include light-emitting diodes, lamps, the sun, and other sources of light. Light 30 that is emitted by one or more of light sources 18 may include visible and infrared light.

Infrared-transparent layer 24 may be mounted in structures 12 so that portions of structures 12 are adjacent to layer 24. For example, portions 12I of structures 12 in interior 14 may be adjacent to layer 24 in interior 14 and portions 12E on the exterior of structures 12 may lie adjacent to layer 24 on the exterior surface of structures 12. To enhance visual aesthetics, it may be desirable for the appearance of layers 24 to match the appearance of adjacent portions of system 10 such as portions 22 (e.g. it may be desirable for layers 24 and portions 22 to be color matched).

Portions (structures) 22 (e.g., external body portions and/or internal body portions in a vehicle) may sometimes be referred to as fascias, fascia structures, or fascia portions of system 10. Interior body portions in a vehicle (e.g., structures 12I) may form portions of a vehicle dashboard or other mounting structure for layer 24. Exterior body portions in a vehicle (e.g., structures 12E) may form portions of a vehicle bumper, front, side, rear, or roof body panel or may form a window portion (e.g., a window portion that is covered with a colored ink or other opaque layer). As an example, in interior 14, structures 22 may form a vehicle dashboard and in exterior 16 structures 22 may form a portion of a bumper or other body part in a vehicle body. Structures 22 may also form part of a display in an electronic device such as a cellular telephone or computer (e.g., a glass display cover layer that is coated with opaque ink or other opaque masking material), may form part of a window, or may form other structures for mounting layers 24.

Structures 22 may be formed from plastic, glass, metal, wood, fabric, other materials, or combinations of these materials. Structures 22 may be visually opaque and may have a variety of different colors. As an example, structures 22 may be black, silver, gray, white, blue, green, red, yellow, or may have other colors. To visually coordinate the appearance of structures 22 and layers 24, it may be desirable for layers 24 to be at least partially opaque at visible wavelengths (e.g., it may be desirable for layers 24 to reflect and block at least 50% or at least 70% or other suitable amount of visible light from 400-700 nm).

As an example, structures 22 may have a blue appearance and layers 24 may have a blue color or other appearance that is color coordinated with the appearance of structures 22. To adjust the color of layers 24 to have a desired visual appearance when viewed by interior and exterior viewers 26, layers 24 may include one or more materials with bulk properties that allow the materials to absorb and reflect visible light (e.g., polymers that contain visible-light-absorbing substances such as dyes or pigments) and/or may include thin-film stacks or other structures that are configured to at least partially block visible light.

Dyes, pigments, thin-film stacks, and other materials and structures in layers 24 may be configured to exhibit desired colors for viewers 26 when illuminated by light 30. If, for example, it is desired for layers 24 to exhibit a blue color, a blue dye or blue pigment may be incorporate into layers 24 or a thin-film stack may be incorporated into layers 24 to produce a desired blue appearance. Particularly when layers 24 have lighter colors (white, silver, gold, red, green, blue, or other non-black colors), it may be desirable for at least a portion of layers 24 to reflect at least 20%, at least 50%, at least 70%, or other suitable amount of visible light at wavelengths of 400-700 nm, while blocking at least 20%, 50%, 70%, 80%, etc. of visible light at 400-700 nm. This may allow light to reflect from layer 24 through an overlapping colored polymer layer or other layer in layers 24 so that the color of the color polymer layer is visible to a viewer.

At the same time, satisfactory performance of infrared-light components 20 can be ensured by configuring infrared-transparent layers 24 to exhibit substantial transparency at infrared light wavelengths. Layers 24 may, for example, exhibit transparency values of greater than 50%, greater than 70%, greater than 80%, greater than 90%, less than 99.99%, or other suitable values at near infrared wavelengths (e.g., wavelengths above 800 nm, from 800-2500 nm, less than 3000 nm, 900-1000 nm, etc.).

If desired, more than one electrical component may be mounted under (behind) each infrared-transparent layer 24. As shown in FIG. 1, for example, one or more components 32 may be mounted behind layers 24 in addition to infrared components 20. Components 32 may include capacitive touch sensors, force sensors, temperature sensors, antennas or other wireless circuits, and/or other electrical components.

Infrared components 20 may be any suitable components that operate at infrared wavelengths. As an example, components 20 may include infrared proximity sensors. Infrared proximity sensors may include a light source such as an infrared light-emitting diode or infrared laser that emits infrared light and a corresponding infrared-light detector (e.g., a silicon photodetector) that measures reflections of the emitted infrared light from nearby objects such as objects 28. Components 20 may also include lidar sensors. Lidar sensors, which may sometimes be referred to as light detection and ranging sensors or laser radar sensors, may have lasers that emit beams of infrared light, scanning systems that scan the emitted beams, and infrared light detectors that detect reflections of the emitted infrared light from objects 28. If desired, components 20 may include infrared cameras, light sources that emit infrared light (e.g., arrays of infrared light-emitting diodes and/or infrared lasers that emit light for an infrared cameras), and/or other infrared components.

Figure 2:
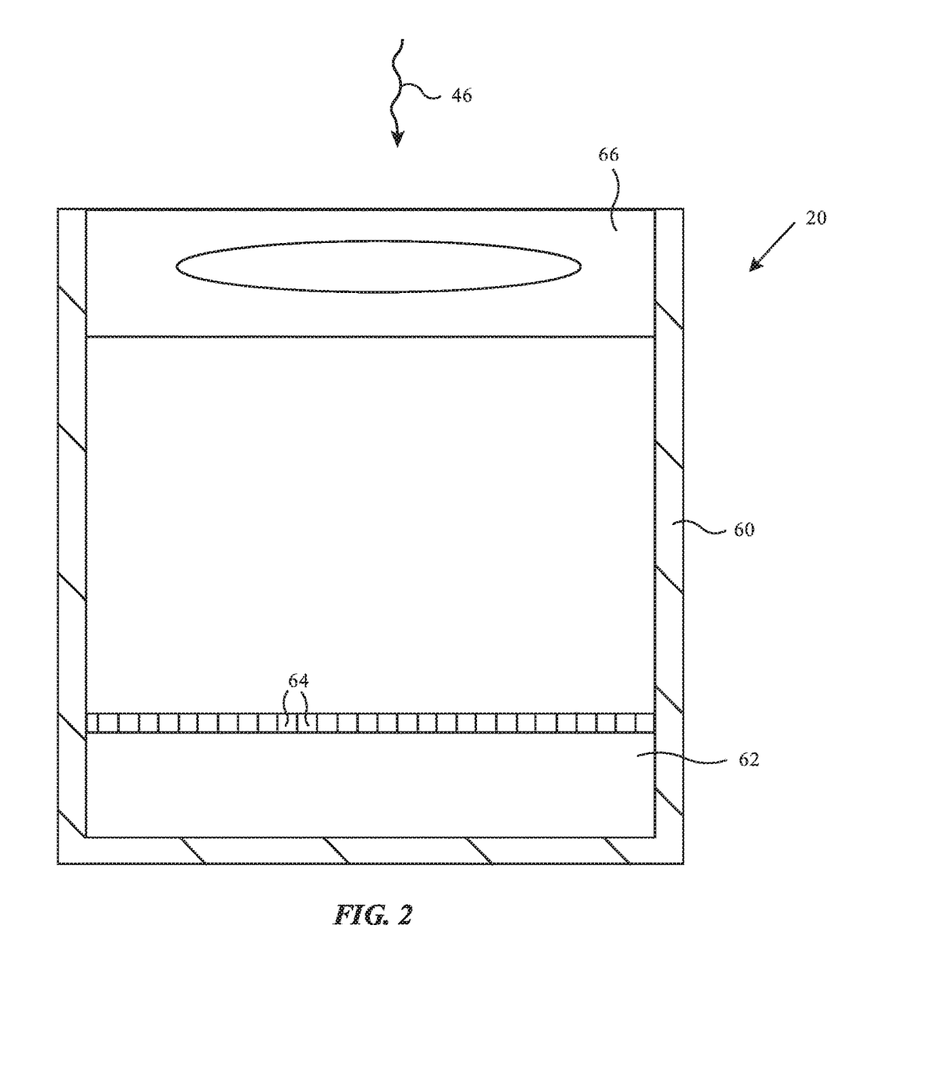
FIG. 2 is a cross-sectional side view of an illustrative optical component such as an infrared camera in accordance with an embodiment.

FIG. 2 is a cross-sectional side view of infrared component 20 in an illustrative configuration in which component 20 is an infrared camera. As shown in FIG. 2, camera (component) 20 may include a housing such as housing 60. Infrared image sensor 62 may be formed from a silicon die having an array of image sensor pixels 64 (e.g., pixels with silicon photodetectors or other infrared-sensitive light detectors) or other digital infrared image sensor. A lens such as lens 66 may include one or more infrared-transparent lens elements and may be used to focus incoming infrared light 46 so that sensor 62 may capture images of objects 28. Infrared components 20 may operate at near infrared wavelengths (e.g., wavelengths of 800-2500 nm, 800 nm or more, 940 nm, 900-1000 nm, 800-1000 nm, below 1000 nm, below 2000 nm, below 3000 nm, or other suitable near infrared wavelengths).

Figure 3:
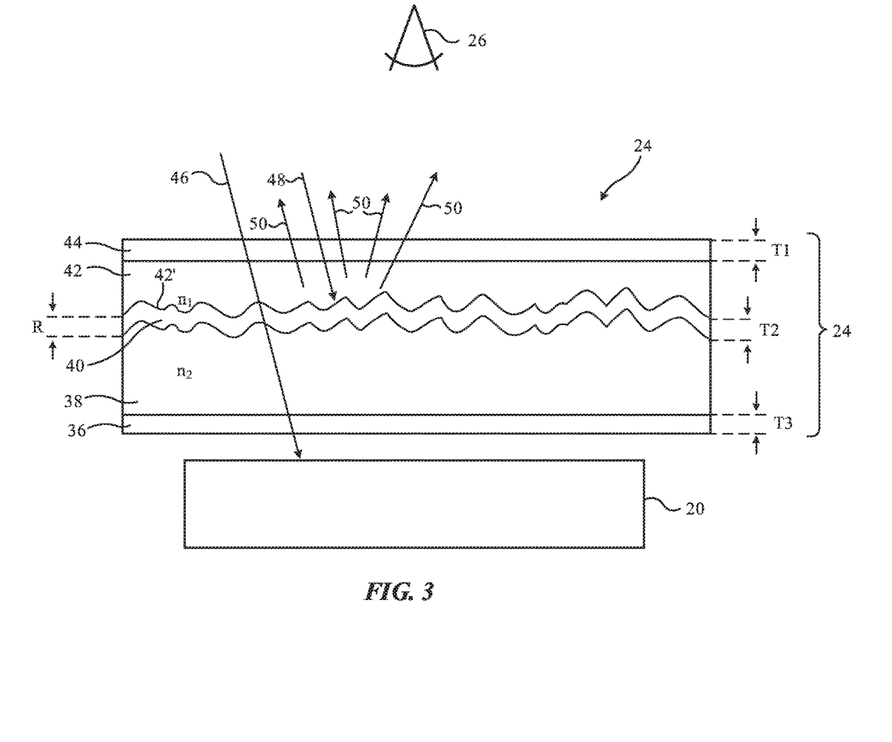
FIG. 3 is a diagram showing how a textured visible-light-scattering layer may be formed in an infrared-transparent layer in accordance with an embodiment.

A cross-sectional side view an illustrative infrared-transparent structure and an associated infrared component 20 (e.g., an infrared camera or other infrared-light component 20) is shown in FIG. 3. As shown in FIG. 3, infrared-transparent layer 24 may have infrared-transparent layers such as layer 38 and 42. Optional coatings 36 and 44 (e.g., antireflection coatings, etc.) may be formed on the inner and outer surfaces of layer 24, respectively. Layers 38 and 42 may be formed from polymers (e.g., polycarbonate, acrylic, etc.), glass, or other materials that are transparent to infrared light. With one illustrative configuration, layer 42 is a substrate layer (e.g., a layer of polycarbonate, etc.) with a textured surface (textured surface 42') on which coating layer 40 is formed to reflect and block visible light while passing infrared light. In this configuration, layer 38 may be an infrared-transparent polymer coating that is formed on coating layer 40. Other types of arrangements may be used, if desired. For example, layer 38 may be a substrate layer with a textured surface (e.g., layer 38 may be a layer of polycarbonate with a textured surface, etc.), layer 40 may be formed from a coating on the textured surface (e.g., a coating that blocks and reflects visible light while passing infrared light), and layer 42 may be an infrared-transparent polymer coating that is formed on coating layer 40. Arrangements for layer 24 in which layer 42 is a substrate layer with a textured surface (surface 42') and layer 38 is a coating that is formed on layer 40 on textured surface 42' may sometimes be described herein as an example. This is, however, merely illustrative. Any suitable configuration for forming a textured visible light reflecting layer such as layer 40 that passes infrared light may be used, if desired.

Layer 24 may be formed in a vehicle body, in a dashboard, or in other portions of a vehicle (e.g., layer 24 may form part of a front, rear, side, or roof window in a vehicle, may form part of a display layer in a portable electronic device such as a cellular telephone or a computer, etc., or may be formed in any other portion of system 10 (e.g., in a position that overlaps optical component 20).

The thickness of layer 38, layer 42, and/or all of the layers of layer 24 may be 1-5 mm, 3-7 mm, 0.5-4 mm, more than 0.05 mm, more than 0.1 mm, more than 0.5 mm, more than 1 mm, more than 2 mm, more than 3 mm, less than 3 mm, less than 4 mm, less than 5 mm, or other suitable thickness. As an example, a substrate layer in layer 24 (e.g., layer 38 or layer 42) may have a thickness of 1-5 mm or other suitable thickness. Coating layers 36, 40, and 44 may have respective thicknesses T3, T2, and T1 of 0.1 to 1 microns, more than 0.2 microns, more than 0.3 microns, 0.2 to 0.8 microns, less than 2 microns, less than 5 microns, or other suitable coating thickness values.

Layer 38 may have refractive index n1 at near-infrared wavelengths and layer 42 may have index of refraction n2 at near-infrared wavelengths. The values of n1 and n2 may be matched at infrared wavelengths (e.g., at 940 nm, at 900-1000 nm, or at other near infrared wavelengths). For example, n1 and n2 may differ by less than 0.3, less than 0.2, less than 0.1, less than 0.05, more than 0.01, or other suitable refractive index difference at these near infrared wavelengths.

Due to the index matching of layers 42 and 38 and the relatively small thickness of layer 40, incoming infrared light 46 may pass through layer 24 without being reflected significantly and without acquiring excessive transmitted wavefront errors. The reflection of infrared light 46 at the interface between layer 42 and 38 may be, for example, less than 2%, less than 1%, less than 0.5%, less than 0.1%, more than 0.01%, or other suitable value. The low reflectivity and low transmitted wavefront error of light 46 that is passing through layer 24 allows this light to be accurately imaged by an infrared camera or accurately processed by other infrared components 20.

As shown in FIG. 3, textured surface 42' of layer 42 creates a light-scattering textured surface on the outer surface of layer 40. This causes layer 40 to scatter incoming visible light 48 in a diffuse pattern (see, e.g., diffuse scattered light 50). In particular, visible light 48 (e.g., light at wavelengths of 400-700 nm) that is incident on layer 24 may be scattered by the visible-light-reflecting and visible-light-blocking properties of layer 40 to produce diffuse scattered visible light 50. The diffuse nature of scattered light 50 may provide layer 24 with a matte appearance to viewer 26.

To provide scattered light 50 with a desired color (e.g., to ensure that the outward appearance of layer 24 is color matched to adjacent structures 22 or is otherwise colored as desired), dyes, pigments, or other colorants may be added to layer 42 and/or the light reflection spectrum of coating 40, layer 42, and/or layer 44 can be adjusted. For example, if it is desired for layer 24 to have a light blue appearance, blue dye or blue pigment that is transparent at near-infrared wavelengths may be incorporated into layer 42. Using this technique, layer 42 and therefore layer 24 may be provided with a desired appearance to match adjacent portions of body 14 such as portions 22 or other structures in system 10. For example, layer 24 may be provided with a white appearance, a silver appearance, a red appearance, a blue appearance, a light blue or light red appearance, a dark or light yellow appearance, a light, dark, or medium gray appearance, a gold appearance, or other appearance.

In some configurations, a portion of visible light 48 may penetrate to layer 38, so dyes, pigments, or other colorants may, if desired, be added to layer 38 to help provide layer 24 with a desired color. Coatings such as coatings 44 and 36 and layer 40 may have light reflection and light transmission spectra that can also be configured to provide layer 24 with a desired appearance (a desired color, gloss, etc.).

Textured surface 42' may be formed by embossing layer 42 with a textured roller, by pressing against surface 42' with a textured plate in a press, or by otherwise applying pressure with a textured tool. Laser processing techniques, chemical processing techniques, and/or other processing techniques may also be used in forming textured surface 42'. Textured surface 42' preferably has a pseudorandom distribution of protrusions (peaks) and recesses (valleys) to provide layer 40 with a diffuse visible light reflectivity. Surface 42' of layer 42 (and therefore the outer surface of layer 40 and the mating surface of layer 38) may be characterized by a root-mean-square (RMS) surface roughness R that is sufficiently small to ensure that infrared light 46 that passes to component 20 through any 5 mm diameter area or any 1 cm diameter area of layer 24 will experience a transmitted wavefront error (at 940 nm, 900-1000 nm, or other suitable near-infrared wavelength) of less than 1 radian RMS.

The maximum slope of the protrusions and valleys on surface 42' may be, as an example, 20-40°, 30°, or other suitable angle. The spatial scale of the surface roughness of layer 42 (e.g., the average size of the peaks and valleys in surface 42') may be 10 microns, 5-15 microns, more than 3 microns, more than 7 microns, less than 15 microns, less than 25 microns, or other suitable size. The RMS surface roughness R of surface 38' may be less than 1 micron, less than 0.5 microns, 50-200 nm, more than 1 nm, more than 10 nm, less than 300 nm, less than 2 microns, or other suitable surface roughness.

Figure 4:
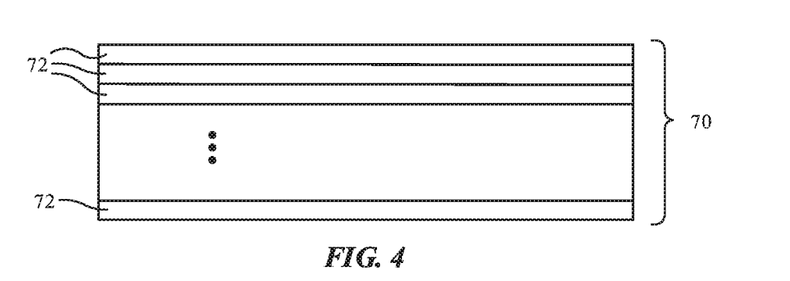
FIG. 4 is a cross-sectional side view of an illustrative multilayer stack that may be used in forming an antireflection coating or a thin-film interference filter such as a visible-light-blocking-and-infrared-light-transmitting filter in accordance with an embodiment.
Figure 5:
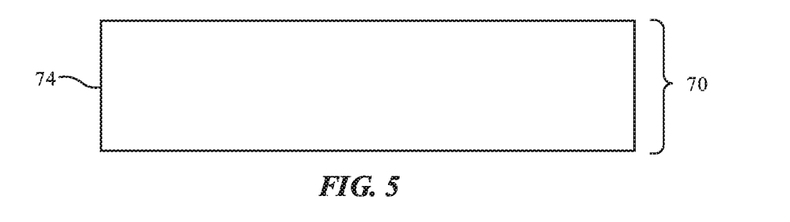
FIG. 5 is a cross-sectional side view of an illustrative layer of bulk material that may exhibit a desired light absorption spectrum such as a spectrum that absorbs visible light and transmits infrared light in accordance with an embodiment.
Figure 6:
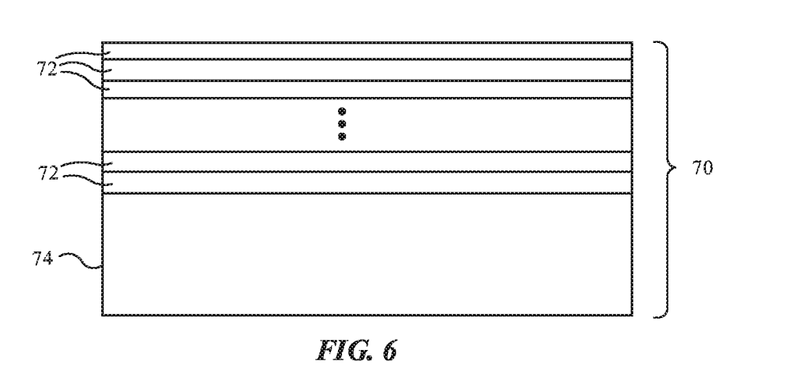
FIG. 6 is a cross-sectional side view of an illustrative coating layer for an infrared-transparent layer that has a layer of bulk material and a stack of thin-film layers in accordance with an embodiment.

FIGS. 4, 5, and 6 are cross-sectional side views of illustrative structures that may be used in forming layers such as layers 36, 40, and 44.

In the configuration of FIG. 4, layer 70 includes a stack of thin-film layers 72. Layer 70 may be used in forming layer 36, layer 40, and/or layer 44 or may be used in forming part of layer 36, layer 40, and/or layer 44. Thin-film layers 72 may include silicon oxide, titanium oxide, aluminum oxide, or other metal oxides, silicon nitride or other nitrides, silicon oxynitride, or other inorganic dielectric layers. Thin-film layers 72 may also include semiconductor layers (e.g., indium tin oxide layers, hydrogenated amorphous silicon layers, etc.), and/or metal thin-film layers. The refractive index of layers 72 may vary between layers. For example, layers 72 may include higher refractive index layers (e.g., silicon nitride or titanium oxide) alternated with lower index of refraction layers (e.g., silicon oxide). If desired, thin-film layers 72 may include organic layers (e.g., one or more polymer layers). There may be any suitable number of thin-film layers 72 in layer 70 (e.g. layer 36, 40, and/or 44). For example, there may be 2-20 layers 72 in layer 70, 3-8 layers 72 in layer 70, more than 3 layers 72 in layer 70, more than 8 layers 72 in layer 70, fewer than 30 layers 72, or other suitable number of thin-film layers 72 in layer 70. The thicknesses of layers 72 may be less than 1 micron, less than 0.5 microns, less than 0.25 microns, more than 0.05 microns, or other suitable thickness.

The number of layers 72 in layer 70 and the thickness and refractive index values of layers 72 may be selected so that layer 70 serves as an infrared antireflection coating (e.g., at 900-1000 nm or other suitable near infrared wavelengths associated with light 46) or may be selected so that layer 70 forms a filter that blocks and reflects visible light and transmits infrared light (e.g., a thin-film interference filter with a cut-off wavelength of 750 nm or other suitable wavelength). Layer 70 may also be configured to form an antireflection coating at both visible and infrared wavelengths. If desired, layers 72 may be configured so that the reflectivity spectrum and/or transmission spectrum of layer 70 has a desired shape that imparts a desired color to layer 24. For example, layer 70 may be configured to reflect red light in an arrangement in which it is desired to provide layer 24 with a reddish appearance.

In the illustrative configuration of FIG. 5, layer 70 has been formed from a layer of material (layer 74) with desired bulk light absorption properties. Layer 74 may be, for example, a layer of semiconductor material such as a hydrogenated amorphous silicon layer that blocks visible light and that transmits infrared light. If desired, bulk light-absorption layers such as layer 74 of FIG. 5 may include two or more layers 74 (e.g., two or more layers that individually absorb and therefor block visible light while transmitting near infrared light due to their bulk optical properties).

If desired, layer 70 (e.g., layer 36, layer 40, and/or layer 44) may be formed from one or more thin-film stacks of layers 72 (e.g., visible-light-blocking-and-infrared-light-transmitting filters or other thin-film filters and/or antireflection coatings of the types described in connection with FIG. 4) and one or more layers 74 with desired bulk optical properties (e.g., desired visible light absorption and infrared light transmission properties, etc.). This type of arrangement is shown in FIG. 6. In the illustrative configuration of FIG. 6, one stack of thin-film layers 72 has been formed on one layer 74, but one or more additional stacks of layers 72 and/or one or more additional layers 74 may be incorporated into layer 70 if desired.

Figure 7:
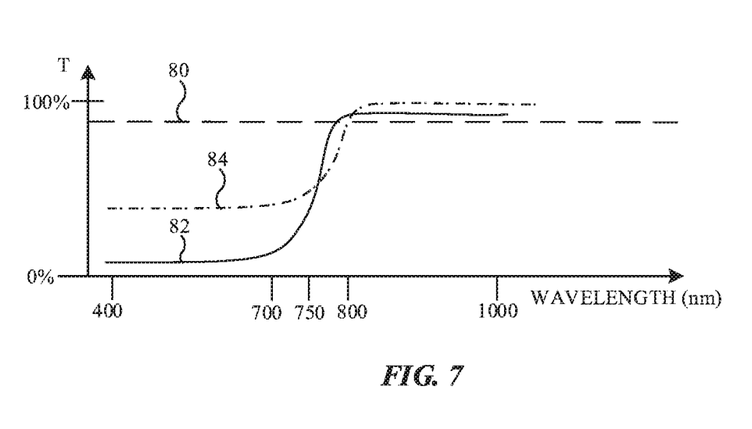
FIG. 7 is a diagram showing illustrative light transmission characteristics for infrared-transparent layers in accordance with an embodiment.

Layers 70 (e.g., layers 36, 40, and/or 44), layer 38, and/or layer 42 may have optical properties (light reflection spectrums and light transmission spectrums) that allow layer 24 to have a desired outward appearance for viewers 18 while allowing infrared light 46 to pass to optical component 20. Illustrative transmission spectrums for layers 36, 40, 44, 38, and/or 42, and therefore for some or all of layer 24 are shown in FIG. 7. As shown in FIG. 7, when a given one of these layers has transmission spectrum 80, both visible light and infrared light may be transmitted through the layer. A transmission spectrum such as transmission spectrum 80 may be used, for example, for an antireflection coating layer (e.g., layer 44 and/or 36). The presence of antireflection layers on layer 24 may enhance light transmission by more than 1%, by more than 2%, by more than 4%, or by other amounts. Infrared light transmission enhancements from layers 44 and 36 may reduce reflections that might otherwise reduce the intensity of incoming light 46 before this light is received by component 20. Visible light transmission enhancements (e.g., in layer 44) may help enhance the appearance of layer 42 (e.g., by decreasing specular reflections from the outermost surface of layer 42).

When a given layer of layer 24 has transmission spectrum 82 (e.g., when layer 40 is provided with transmission spectrum T and a reflectivity spectrum R that is equal to 1-T or other suitable amount), layer 24 will be provided with good visible light reflecting and blocking capabilities and satisfactory infrared transparency. As illustrated by curve 82, layer 40 and layer 24 may exhibit a visible light transmission at 400-700 nm that is less than 20%, less than 10%, less than 5%, less than 2%, less than 1%, more than 0.1%, or other suitable amount. The reflectivity of layer 40 may be more than 80%, more than 90%, more than 95%, more than 98%, more than 99%, less than 99.9%, or other suitable amount (e.g. at visible light wavelengths of 400-700 nm).

If desired, layer 40 may be provided with an intermediate amount of visible light transmission (see, e.g., curve 84, which shows how layer 40 and, if desired, layer 24 may have a visible light transmission of 40-60% or other suitable intermediate value and may therefore have a visible light reflection of 60-40% or other suitable amount). This amount of light reflection may be desirable for layer 40 when the target appearance for layer 24 is medium gray.

Other layers in layer 24 (e.g., layers 42, 38, 44, and 36) may also have transmission spectrums such as spectrums 80, 84, and/or 82, if desired. For example, dye or pigment in layer 42 may have spectrums such as spectrums 82 and 84 and may absorb visible light and pass infrared light.

The transmission spectrums of FIG. 7 (and associated reflectivity spectrums) such as spectrums 82 and 84 have a cut-off wavelength of about 750 nm. For example, transmission T may exhibit a long-wavelength pass band starting above 800 nm. If desired, the transmission and reflection spectrums for one or more of the layers of layer 24 may have more complex shapes (e.g., to create a desired color for layer 24 or to modify the color of layer 24).

In configurations in which layer 24 forms a window for a vehicle or other system, the window may be formed from layers such as layers 42 and/or 38 and the other layers of FIG. 3 and may, if desired, include one or more additional layers of transparent glass, clear polymer (e.g., polycarbonate), polymer adhesive layers, and/or other layers. In some arrangements, window(s) for system 10 may include laminated window structures such as one or more layers of glass with interposed polymer layer(s). The polymer in a laminated window may be, for example, a polymer such as polyvinyl butyral (PVB) or ethylene-vinyl acetate (EVA). Layer 24 may form one of the layers in a two-layer laminated vehicle window or may be embedded in the PVB or EVA layer between two window layers (as examples). Configurations may also be used for system 10 in which layer 24 forms a visible-light-reflecting-and-infrared-light-transmitting structure for other portions of a vehicle (or other system) such as a vehicle body, a portion of a dashboard, other interior and/or exterior structural portions of a vehicle or other system, portions of a display in an electronic device such as a portable electronic device, portions of a housing or other structure in electronic equipment, etc.

The foregoing is merely illustrative and various modifications can be made to the described embodiments. The foregoing embodiments may be implemented individually or in any combination.

What is claimed is:
1. A system, comprising:
 an infrared optical component;
 a visible-light-reflecting-and-infrared-light-transmitting layer that overlaps the infrared optical component and that includes:

a first infrared-light-transmitting layer with a textured surface, a visible-light-reflecting-and-infrared-light-transmitting coating layer on the textured surface, and a second infrared-light-transmitting layer on the visible-light-reflecting-and-infrared-light-transmitting coating layer; and vehicle support structures laterally adjacent to the visible-light-reflecting-and-infrared-light-transmitting layer, wherein an entire lateral area of the visible-light-reflecting-and-infrared-light-transmitting layer is color matched to the vehicle support structures.

2. The system defined in claim 1 wherein the first infrared-light-transmitting layer has a first refractive index, wherein the second infrared-light-transmitting layer has a second refractive index, and wherein the first and second refractive indexes differ by less than 0.2.

3. The system defined in claim 1 wherein the infrared optical component comprises an infrared camera.

4. The system defined in claim 1 wherein the visible-light-reflecting-and-infrared-light-transmitting coating layer comprises a stack of thin-film layers on the textured surface.

5. The system defined in claim 4 wherein the stack of thin-film layers is a thin-film-interference filter formed from inorganic layers with different index of refraction values that is configured to reflect at least 50% of visible light from 400-700 nm and that is configured to transmit at least 80% of infrared light at 900-1000 nm.

6. The system defined in claim 5 wherein the first infrared-light-transmitting layer comprises a polymer layer.

7. The system defined in claim 6 wherein the polymer layer comprises a polycarbonate layer.

8. The system defined in claim 3 wherein the visible-light-reflecting-and-infrared-light-transmitting coating layer comprises at least one layer that exhibits a bulk visible light transmission of less than 80% and an infrared light transmission of greater than 80%.

9. The system defined in claim 3 wherein the visible-light-reflecting-and-infrared-light-transmitting coating layer comprises a layer of amorphous silicon.

10. The system defined in claim 1 wherein a given one of the first infrared-light-transmitting layer and the second infrared-light transmitting layer comprises polymer that includes a dye that colors the polymer.

11. The system defined in claim 1 wherein a given one of the first infrared-light-transmitting layer and the second infrared-light transmitting layer comprises polymer that includes a pigment that colors the polymer.

12. Apparatus, comprising:
a textured polymer layer having a textured surface;
a thin-film interference filter formed from a stack of thin-film layers on the textured polymer layer, wherein the thin-film interference filter is configured to reflect visible light and transmit infrared light;
a polymer coating layer on the thin-film interference filter;
a first anti-reflective coating on the textured polymer layer; and
a second anti-reflective coating on the polymer coating layer.

13. The apparatus defined in claim 12 wherein the textured polymer layer has a first refractive index, wherein the polymer coating layer has a second refractive index, and wherein the first and second refractive indexes are within 0.2 at wavelengths of 900-1000 nm.

14. The apparatus defined in claim 12 further comprising:
an infrared optical component that is configured to receive infrared light at a wavelength of 900-1000 nm through the thin-film interference filter and the first anti-reflective coating.

15. The apparatus defined in claim 14 further comprising colorant in a given one of the textured polymer layer and the polymer coating layer, wherein visible light is colored by the colorant and diffusely reflects from the thin-film interference filter.

16. A vehicle having an interior and an exterior, comprising:
a vehicle body that separates the interior from the exterior;
a dashboard in the interior;
a near-infrared camera; and
a visible-light-reflecting-and-infrared-light-transmitting layer in the dashboard and overlapping the near-infrared camera, wherein the visible-light-reflecting-and-infrared-light-transmitting layer comprises:
a first infrared-transparent layer having a textured surface,
a thin-film stack at the textured surface that is configured to transmit infrared light from the interior to the near-infrared camera and that is configured to reflect at least some visible light from the interior through the first infrared-transparent layer and back towards the interior, and
a second infrared-transparent layer, wherein the thin-film stack is interposed between the first infrared-transparent layer and the second infrared-transparent layer.

17. The vehicle defined in claim 16 wherein the first infrared-transparent layer comprises a polymer containing a colorant.

18. The vehicle defined in claim 17 wherein the first and second infrared-transparent layers comprise polymers with index of refraction values that match within 0.05 and wherein the colorant provides the first infrared-transparent layer with a non-black color.

19. The apparatus defined in claim 12, wherein the textured polymer layer is interposed between the first anti-reflective coating and the thin-film interference filter, wherein the thin-film interference filter is interposed between the textured polymer layer and the polymer coating layer, and wherein the polymer coating layer is interposed between the thin-film interference filter and the second anti-reflective coating.

20. The vehicle defined in claim 16, wherein the visible-light-reflecting-and-infrared-light-transmitting layer further comprises:
a first infrared antireflection coating on the first infrared-transparent layer; and
a second infrared antireflection coating on the second infrared-transparent layer.

* * * * *